United States Patent
Schmale et al.

(10) Patent No.: US 12,447,556 B2
(45) Date of Patent: Oct. 21, 2025

(54) METHOD FOR PRODUCING A COATED TAILORED WELDED BLANK BY MEANS OF LASER-BEAM WELDING OR HYBRID LASER/GAS-METAL-ARC WELDING AND FILLER WIRE AND USE THEREOF FOR THIS PURPOSE

(71) Applicant: Salzgitter Europlatinen GmbH, Salzgitter (DE)

(72) Inventors: Hans-Christian Schmale, Braunschweig (DE); Matthias Höfemann, Wolfenbüttel (DE); André Kröff, Burgdorf (DE); Joachim Schöttler, Braunschweig (DE); Manuel Maikranz-Valentin, Baunatal (DE)

(73) Assignee: Salzgitter Europlatinen GmbH, Salzgitter (DE)

( * ) Notice: Subject to any disclaimer, the term of this patent is extended or adjusted under 35 U.S.C. 154(b) by 955 days.

(21) Appl. No.: 17/626,378

(22) PCT Filed: Jul. 10, 2020

(86) PCT No.: PCT/EP2020/069660
§ 371 (c)(1),
(2) Date: Jan. 11, 2022

(87) PCT Pub. No.: WO2021/009078
PCT Pub. Date: Jan. 21, 2021

(65) Prior Publication Data
US 2022/0258283 A1 Aug. 18, 2022

(30) Foreign Application Priority Data
Jul. 12, 2019 (DE) .......................... 102019119012.6

(51) Int. Cl.
*B23K 26/322* (2014.01)
*B23K 26/24* (2014.01)
(Continued)

(52) U.S. Cl.
CPC ............ *B23K 26/322* (2013.01); *B23K 26/24* (2013.01); *B23K 26/348* (2015.10);
(Continued)

(58) Field of Classification Search
CPC .... B23K 26/24; B23K 26/322; B23K 26/348; B23K 35/3086; B23K 2101/185;
(Continued)

(56) References Cited

U.S. PATENT DOCUMENTS 9,833,863 B2 12/2017 Flügge et al.
9,862,058 B2 * 1/2018 Breuer .................... C22C 38/22
(Continued)

FOREIGN PATENT DOCUMENTS

DE 933670 C 9/1955
DE 102017120051 A1 2/2019
(Continued)

OTHER PUBLICATIONS

International Search Report and Written Opinion of the International Searching Authority from corresponding Patent Cooperation Treaty (PCT) Application No. PCT/EP2020/069660, indicated completed on Sep. 11, 2020.
(Continued)

Primary Examiner — Brian W Jennison
(74) Attorney, Agent, or Firm — Gardner, Linn, Burkhart & Ondersma LLP (57) ABSTRACT

A tailored welded blank produced from at least two blank parts, where at least one is a press-hardenable manganese-boron steel and at least one has a coating of aluminum or an aluminum-based alloy. The parts are welded by laser-beam
(Continued)

welding or hybrid laser/gas-metal-arc welding, while retaining the coating, using shielding gas and a filler wire having in % by weight: C: 0.41 to 0.9; Si: 0.4 to 4; Mn: 0.4 to 3; optionally Cr: 0 to 10; and with optional alloying of one or more of: Mo: 0.01 to 1.0; B: 0.0008 to 0.0040; Ti: $2.5 \times B \leq Ti \leq 5 \times B$; V: 0.01 to 0.4; Nb: 0.01 to 0.2; W: 0.01 to 0.2; the remainder Fe and unavoidable impurities. The high proportion of C and Cr or additionally or alternatively of Mo, V, Nb and/or W enables hardening by carbide formation in a weld-seam region after welding.

20 Claims, 3 Drawing Sheets (51) Int. Cl.
| | |
|---|---|
| *B23K 26/348* | (2014.01) |
| *B23K 35/30* | (2006.01) |
| *B23K 101/00* | (2006.01) |
| *B23K 101/18* | (2006.01) |
| *B23K 101/34* | (2006.01) |
| *B23K 103/04* | (2006.01) |
| *B32B 15/01* | (2006.01) |
| *C21D 1/673* | (2006.01) |
| *C21D 6/00* | (2006.01) |
| *C21D 9/50* | (2006.01) |
| *C22C 38/02* | (2006.01) |
| *C22C 38/04* | (2006.01) |
| *C22C 38/22* | (2006.01) |
| *C22C 38/24* | (2006.01) |
| *C22C 38/28* | (2006.01) |
| *C22C 38/32* | (2006.01) |
| *C23C 2/26* | (2006.01) |

(52) U.S. Cl.
CPC ........ *B23K 35/3086* (2013.01); *B32B 15/012* (2013.01); *C21D 1/673* (2013.01); *C21D 6/002* (2013.01); *C21D 6/005* (2013.01); *C21D 6/008* (2013.01); *C21D 9/50* (2013.01); *C22C 38/02* (2013.01); *C22C 38/04* (2013.01); *C22C 38/22* (2013.01); *C22C 38/24* (2013.01); *C22C 38/28* (2013.01); *C22C 38/32* (2013.01); *C23C 2/26* (2013.01); *B23K 2101/006* (2018.08); *B23K 2101/185* (2018.08); *B23K 2101/34* (2018.08); *B23K 2103/04* (2018.08)

(58) Field of Classification Search
CPC .......... B23K 2103/04; B23K 2101/006; C21D 1/673; C21D 6/002; C21D 6/005; C21D 6/008; C21D 9/50
See application file for complete search history.

(56) References Cited

U.S. PATENT DOCUMENTS

| | | | |
|---|---|---|---|
| 9,901,969 B2* | 2/2018 | Miyazaki | ............. B21D 22/022 |
| 10,828,729 B2* | 11/2020 | Cretteur | ................ C23C 28/023 |
| 2015/0030382 A1* | 1/2015 | Cretteur | ................ C21D 9/505 |
| | | | 403/272 |
| 2015/0043962 A1* | 2/2015 | Miyazaki | ............... B23K 26/32 |
| | | | 72/364 |
| 2016/0368094 A1* | 12/2016 | Breuer | ............... B23K 35/3073 |

FOREIGN PATENT DOCUMENTS

| | | |
|---|---|---|
| EP | 2832887 A1 | 2/2015 |
| EP | 3620256 A1 | 3/2020 |
| JP | H03294084 A | 12/1991 |
| JP | H06106381 A | 4/1994 |
| JP | H10298715 A | 11/1998 |
| JP | 2003220492 A | 8/2003 |
| SU | 440228 A1 | 8/1974 |
| WO | 2018203513 A1 | 11/2018 |

OTHER PUBLICATIONS

Preliminary Report on Patentability of the International Searching Authority in English from corresponding Patent Cooperation Treaty (PCT) Application No. PCT/EP2020/069660, completed Jan. 18, 2022.

* cited by examiner

METHOD FOR PRODUCING A COATED TAILORED WELDED BLANK BY MEANS OF LASER-BEAM WELDING OR HYBRID LASER/GAS-METAL-ARC WELDING AND FILLER WIRE AND USE THEREOF FOR THIS PURPOSE

CROSS REFERENCE TO RELATED APPLICATION

The present application claims the priority benefits of International Patent Application No. PCT/EP2020/069660, filed Jul. 10, 2020, and claims benefit of German patent application no. DE 10 2019 119 012.6, filed on Jul. 12, 2019.

BACKGROUND AND FIELD OF THE INVENTION

The invention relates to a method for producing a tailored blank from at least two blank parts, of which at least one blank part consists of a press-hardenable manganese-boron steel, of which at least one blank part is provided on at least one side with a coating consisting of aluminum or an aluminum-based alloy and the at least two blank parts are welded by means of laser beam welding or laser-metal inert gas hybrid welding using inert gas and supplying a filler wire. The invention also relates to a method for producing a press-hardened component therefrom and to a filler wire therefor.

Tailored and welded blanks consisting of steel sheet, also referred to as TWB (Tailored Welded Blanks), are generally known. Tailored Welded Blanks are composed of at least two blank parts with similar or different material qualities, such as e.g. 22MnB5 on HC340LA, having identical or different thicknesses and/or identical or different coatings, preferably by means of laser beam welding. The selection and combination of the different material qualities, thicknesses and/or coatings and their associated dimensions is made with a view to a component to be produced therefrom which then has the desired properties at different points in each case. Such Tailored Welded Blanks are used in a variety of ways in the automotive industry and are further processed to form bodywork and chassis components by means of forming, in particular press-hardening.

A method for laser beam welding a plurality of steel sheets from press-hardenable manganese-boron steel, in particular from steel grade 22MnB5, to form a Tailored Welded Blank is already known from German laid-open document DE 10 2017 120 051 A1. Accordingly, the steel sheets to be joined have a different thickness and/or a different tensile strength. Moreover, at least one the steel sheets is coated on at least one side with aluminum or an aluminum alloy, in particular an AlSi alloy. The AlSi alloy can have an Al content in the range of 70 to 90 wt. % Al. The steel sheets have a thickness of 0.5 to 4.0 mm and the coating has a thickness of at most 100 μm, in particular at most 50 μm. Laser beam welding is effected by supplying a filler wire into a melting bath of the adjoining and molten steel sheets, which bath is produced exclusively by a laser beam. The filler wire has the following composition: C: 0.1-0.4 wt. %, Si: 0.5-2.0 wt. %, Mn: 1.0-2.5 wt. %, Cr and Mo: 0.5-2.0 wt. %, Ni: 1.0 to 4.0 wt. %, with the remainder being Fe and unavoidable impurities. Manganese and nickel should promote the formation of austenite. The filler wire contains substantially no aluminum. The filler wire is melted by the melting bath and supplied thereto in order to reduce the mass content of the aluminum which enters the melting bath during the welding procedure by the melting of the AlSi coating. In this manner, the manganese content of the filler wire should always be higher, preferably about 0.2 wt. % higher, than the manganese content of a base material of the coated steel sheet. Furthermore, it is said to be favorable if the content of chromium and molybdenum of the filler wire is higher than in the base material. Preferably, the combined chromium/molybdenum content of the filler wire is about 0.2 wt. % higher than the combined chromium/molybdenum content of the base material. Prior to supplying the filler wire into the melting bath, the filler wire is heated to a temperature of at least 50° C., preferably at least 90° C. The steel sheets are joined by laser beam welding in the butt joint or lap joint with a gap of less than 0.8 mm, in particular less than 0.4 mm. The laser beam welding is effected with inert gas.

SUMMARY OF THE INVENTION

The present invention provides a method for producing a tailored, coated blank by means of laser beam welding or laser-metal inert gas hybrid welding, a press-hardened component therefrom and a filler wire and a use thereof, by means of which blank parts can be joined to form a tailored blank in a process-reliable manner.

In accordance with an aspect of the invention, in the case of a method for producing a tailored blank from at least two blank parts, of which at least one blank part consists of a press-hardenable manganese-boron steel, of which at least one blank part is provided on at least one side with a coating consisting of aluminum or an aluminum-based alloy and the at least two blank parts are welded by means of laser beam welding or laser-metal inert gas hybrid welding using inert gas and supplying a filler wire, joining the blank parts to form a tailored blank in a process-reliable manner is achieved by virtue of the fact that the filler wire has the following chemical composition in wt. %: C: 0.41 to 0.9, preferably 0.43 to 0.9; Si: 0.4 to 4; Mn: 0.4 to 3; optionally Cr: 0 to 10; and with optional addition by alloying of one or more of the following additional elements: Mo: 0.01 to 1.0; B: 0.0008 to 0.0040; Ti: $2.5 \times B <= Ti <= 5 \times B$; V: 0.01 to 0.4; Nb: 0.01 to 0.2; W: 0.01 to 0.2; with the remainder being Fe and unavoidable impurities. In this manner, the blank part consisting of the press-hardenable manganese-boron steel and the further, non-press-hardenable blank part, preferably consisting of HC340LA, also comprises the coating consisting of aluminum or an aluminum-based alloy. Using the filler wire in accordance with the invention, the blank parts can be joined to form a tailored blank without removing the coating consisting of aluminum or an aluminum-based alloy previously in the joining region, whether this is e.g. mechanically or by evaporation by means of an additional laser beam. Removing the coating prior to welding is not performed inter alia for reasons of improved corrosion protection. The high content of C and Cr or additionally or alternatively of Mo, V, Nb, W allows hardening to be achieved in a welding seam region after welding, which hardening is attributed on the one hand to transformation hardening of the C content and on the other hand to precipitation hardening by the carbide forming agents Cr, Mo, V, Nb, W. This results in considerably more stable and more homogeneous hardening profiles over the weld seam, in particular after possible press-hardening of the tailored blank to form a component. In an advantageous manner, the composition of the filler wire may be selected such that the mass content of the aluminum—which enters the melting bath by melting the coating consisting of aluminum or an aluminum-based alloy, in particular the AlSi coating—is reduced. The coating entering the melting bath is already thinned per se solely owing to the filler wire introduced into the melting bath. In addition, the coating, entering the melting bath, of possibly weakened microstructure regions is compensated for by the formation of strength-increasing and hardness-increasing carbides. Moreover, homogenization of the melting bath is effected by the finely distributed carbides.

On the whole, the substantial advantage of the filler wire can be considered that of achieving a process-reliable hardening profile in the weld seam, even after possible press-hardening, by the additional carbides.

In a first preferred alternative composition of the filler wire, the chemical composition also has in wt. %, in addition to the high C content, a high content of Cr avoiding the use of the other said optional additional elements. There is thus already sufficient C and Cr present in order to also achieve the desired carbide formation in addition to the hardening by C. Accordingly, the filler wire in this alternative has the following chemical composition in wt. %: C: 0.41 to 0.9, preferably 0.43 to 0.9; Si: 0.4 to 4; Mn: 0.4 to 3; Cr: 2.0 to 10, preferably 3.0 to 10; with the remainder being Fe and unavoidable impurities.

One of the preferred alternative compositions of the filler wire is a chemical composition in wt. %, in which the content of Cr is reduced and is supplement by at least one of the additional elements as follows to form a total composition: C: 0.41 to 0.9, preferably 0.43 to 0.9; Si: 0.4 to 4; Mn: 0.4 to 3; Cr: 0.05 to 10, preferably 0.05 to 3, or preferably 0.3 to 10; at least one of the following additional elements: Mo: 0.01 to 1.0, preferably 0.01 to 0.2; B: 0.0008 to 0.0040; Ti: $2.5 \times B \leq Ti \leq 5 \times B$; V: 0.01 to 0.4, preferably 0.01 to 0.2; Nb: 0.01 to 0.2; W: 0.01 to 0.2; with the remainder being Fe and unavoidable impurities.

The filler wire described in the preceding paragraph has, in three particular alternative compositions, in addition to the basic elements C, Si, Mn, again with a reduction in the element Cr to 0.05 to 3 wt. %, in each case only one or a group of the following additional elements in wt. %: Mo: 0.01 to 1.0 or V: 0.01 to 0.4 or B: 0.0008 to 0.0040 with Ti: $2.5 \times B \leq Ti \leq 5 \times B$ (with the remainder being Fe and unavoidable impurities).

A preferred alternative composition of the filler wire is a chemical composition in wt. % with the basic elements C: 0.41 to 0.9, preferably 0.43 to 0.9; Si: 0.4 to 4; Mn: 0.4 to 3, omitting the basic element Cr, the function of which is assumed by at least one of the following additional elements: Mo: 0.01 to 1.0, preferably 0.01 to 0.2; B: 0.0008 to 0.0040; Ti: $2.5 \times B \leq Ti \leq 5 \times B$; V: 0.01 to 0.4, preferably 0.01 to 0.2; Nb: 0.01 to 0.2; W: 0.01 to 0.2; with the remainder being Fe and unavoidable impurities.

In three particular alternative compositions, the filler wire described in the preceding paragraph has, in addition to the basic elements C, Si, Mn, again omitting the element Cr, in each case only one or a group of the following additional elements in wt. %: Mo: 0.01 to 1.0 or V: 0.01 to 0.4 or B: 0.0008 to 0.0040 with Ti: $2.5 \times B \leq Ti \leq 5 \times B$ (with the remainder being Fe and unavoidable impurities).

In said range specifications for the chemical composition of the filler wire—such as e.g. C: 0.41 to 0.9—the minimum and maximum values are to be understood to be included.

These components of the filler wire are to be understood to be a non-exhaustive enumeration of elements, of additional elements of the remainder being iron (remainder being Fe) and unavoidable impurities in terms of required components in addition to other components. Preferably, said components of the filler wire can also be understood to be exhaustive in the sense of "consisting of" because all the advantageous and desired effects are already achieved with the respective chemical composition of the filler wire.

The previously described and alternative chemical compositions of the filler wire have, in relation to the basic elements and additional elements and in each case in the claimed ranges, the following effects in the solidifying melt and during subsequent press-hardening of the tailored blank to form a component.

In dissolved form, carbon C increases the hardenability of steel. As the forcibly dissolved carbon content in the martensite increases, the lattice distortions and, associated therewith, the strength increase. C, when present in sufficient amounts, forms special carbides with other metals such as e.g. chromium, titanium, niobium, vanadium. Therefore, in the present filler wire, the C content in wt. % is stated to be relatively high at 0.41 to 0.9, preferably 0.43 to 0.9. Therefore, it is not only the type but also the distribution and extent of the precipitations which are of crucial significance for the resulting increase in strength.

During casting, silicon Si binds oxygen and is therefore used for killing purposes in the course of deoxidation of the steel. A minimum content of Si is stated to be 0.4 wt. %. Si causes a strong mixed crystal hardening and thus increases tensile strength and yield strength. Si also hinders the formation of carbides and is thus limited to a maximum content of 4 wt. %. Furthermore, Si increases the conversion temperature A1 (by 20 to 30 K for each 1 wt. % Si, but only up to 3 wt. %) which can hinder the austenitization.

Therefore, Si is also limited to a maximum content of 4 wt. %.

Manganese Mn promotes the mixed crystal hardening and considerably improves the potential hardness increase. By reason of an inhibition of diffusion, the perlite and bainite conversion is shifted towards longer times and the martensite starting temperature is decreased. The manganese content is between 0.4 to 3 wt. %.

Chromium Cr, in dissolved form and even in small quantities, considerably increases the hardenability of steel. In the form of chromium carbides, particle solidification and an increase in tempering resistance is caused. A chromium content of 0 to 10 wt. % is provided, addition by alloying thus being optional.

In dissolved form, molybdenum Mo increases the hardenability of steel and shifts the austenite conversion towards lower temperatures. The addition by alloying of Mo is optional and the content is between 0.01 to 1 wt. %.

Boron B is extremely effective in increasing hardenability. A boron content of 0.0008 to 0.004 wt. % is provided. In order to become effective, boron must be present in dissolved form. Since it has a high affinity to nitrogen, the nitrogen must initially be removed, preferably by the required quantity of titanium. Therefore, in the filler wire, Ti is provided in a range of $2.5 \times B \leq Ti \leq 5 \times B$.

By reason of its high affinity to nitrogen, titanium Ti is primarily precipitated as TiN during solidification. Moreover, it appears together with niobium as a mixed carbide. Titanium also has a delaying effect upon the recrystallization but is less effective in this regard than niobium. Titanium functions by means of precipitation hardening. The larger TiN particles are less effective than the more finely distributed mixed carbides.

Vanadium V has a delaying effect upon the recrystallization and in the form of carbides particle solidification is effected. The addition by alloying of V is optional and the content is between 0.01 to 0.4 wt. %.

Niobium Nb has a delaying effect upon the recrystallization and in the form of carbides or carbonitrides particle solidification is effected. The addition by alloying of Nb is optional and the content is between 0.01 to 0.2 wt. %.

Tungsten W acts as a carbide forming agent and thus increases the tensile strength. The addition by alloying of W is optional and the content is between 0.01 to 0.2 wt. %.

The filler wire is advantageously supplied to the melting bath at a temperature of 5 to 40° C., preferably 15 to 25° C. This temperature is the respective ambient temperature. Heating or cooling of the filler wire is thus not provided. It is also feasible to heat the filler wire before supplying it to the melting bath.

In conjunction with the laser beam welding or laser-metal inert gas hybrid welding, the melting bath is advantageously exclusively produced by means of a laser beam. In addition, the melting bath can also be produced with the electric arc of a laser-metal inert gas hybrid process.

The chemical composition of the filler wire is particularly adapted to a coating which, as an aluminum-based alloy of the coating, contains—in addition to aluminum—one or more of the elements Fe, Si, Mg or Cr, or is an AlSi alloy.

Tailored and welded blanks consisting of steel sheet, which are also known as TWB (Tailored Welded Blanks), preferably require the blank parts to be joined to differ from one another in relation to material quality, thickness and/or coatings or to be similar in one of said technical specifications, such as material quality, thickness and/or coating.

The chemical composition of the filler wire is particularly adapted to a base material of the blank parts to be joined on the one hand consisting of manganese-boron steel, such as e.g. 22MnB5, or a comparable one with higher strength, e.g. a 30MnB5 or stronger, and on the other hand consisting of non-press-hardenable steel or manganese-silicon steel, such as e.g. HC340LA. The blank parts to be joined are each provided with the coating.

The chemical composition of the filler wire is also highly suitable to produce press-hardened components from the tailored blanks produced in accordance with the invention, in particular as bodywork or chassis components for the automotive industry. In particular, no reduction in hardness quality or inhomogeneous hardness profiles can be determined in the region of the weld seam even after the press-hardening.

In particular, the present invention relates to the alloy concept for the filler wire per se, which is specifically adapted to a use for the integrally bonded connection of at least two blank parts to form a tailored blank, of which at least one blank part consists of a press-hardenable manganese-boron steel and of which at least one blank part is provided on at least one side with a coating consisting of aluminum or an aluminum-based alloy, by means of laser beam welding or laser-metal inert gas hybrid welding using insert gas. The alternative chemical compositions of the filler wire per se correspond to the previously described statements made in relation to the method and the advantages described therein.

The present invention also relates to a use of the previously described filler wire for a method for producing a tailored blank from at least two blank parts, of which at least one blank part consists of a press-hardenable manganese-boron steel, of which at least one blank part is provided on at least one side with a coating consisting of aluminum or an aluminum-based alloy and the at least two blank parts are connected by means of laser beam welding or laser-metal inert gas hybrid welding using inert gas and supplying the filler wire.

An exemplified embodiment of the invention and results of associated tests will be explained in more detail hereinafter with the aid of the figures.

DETAILED DESCRIPTION OF THE PREFERRED EMBODIMENTS

Figure 1:
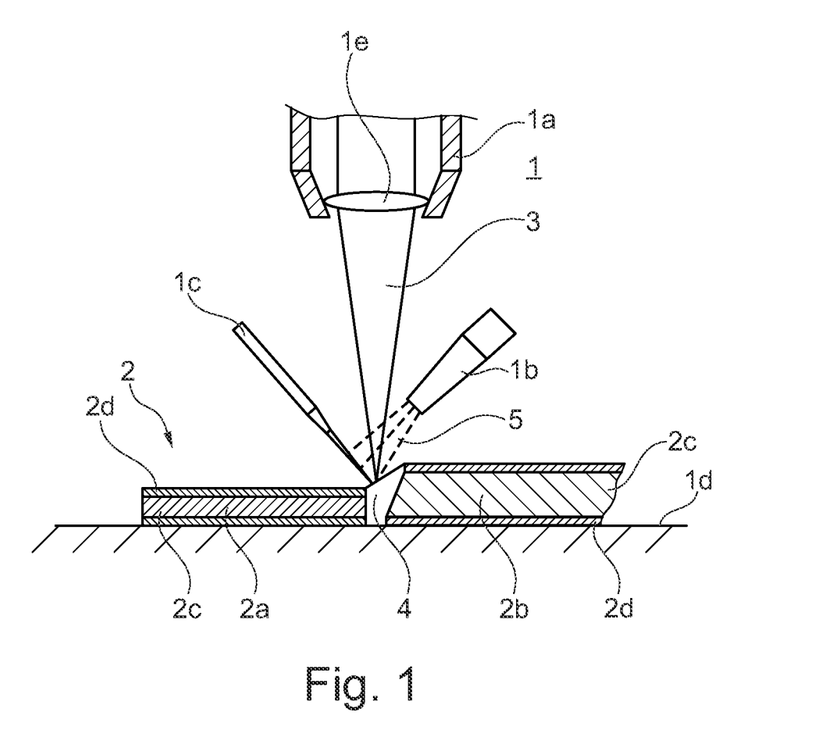
FIG. 1 shows a schematic view of a laser beam welding process with a filler wire.

FIG. 1 shows a schematic view of a laser beam welding process 1, by means of which a tailored blank 2 can be produced in accordance with the present invention. As is typical, the laser beam welding process 1 consists substantially of a laser welding head 1a, to which an inert gas line 1b and a filler wire guide 1c are allocated. The laser beam welding process 1 also comprises a support 1d for the blank parts 2a, 2b, to be joined, of the tailored blank 2. The laser welding head 1a which is arranged above the horizontally oriented blank parts 2a, 2b to be joined and of which only one protective nozzle for a focusing lens 1e is shown, is used to direct a laser beam 3 onto a preferably linear joint between the blank parts 2a, 2b to be joined, in order to produce a melting bath 4 from the melting blank parts 2a, 2b for a form-fitting connection of the blank parts 2a, 2b. For this purpose, the laser beam 3 is correspondingly focused and oriented via the focusing lens 1e. A solid state laser, in particular a disk laser, having a power in the range of 4 to 6 kW is used as the beam source for the laser beam 3. In this manner, the melting bath 4 is produced exclusively by the laser beam 3. The welding procedure per se is performed in the presence of a suitable inert gas 5 which is directed onto the melting bath 4 or a focusing region of the laser beam 3 via the inert gas line 1b. Pure argon or a mixture of argon and carbon dioxide and/or helium is used as the inert gas 5. Moreover, an addition in the form of a filler wire 6 is added to the melting bath 4 and is supplied to the melting bath 4 via the filler wire supply 1c. The filler wire 6 is melted by the laser beam 3 or the melting bath 4. The filler wire 6 is supplied to the melting bath 4 at room temperature. In this context, room temperature is understood to mean an ambient temperature in the range of 5° C. to 40° C., preferably in the range of 15° C. to 25° C. It is not necessary to actively heat or cool the filler wire 6 prior to use, but this is a permissible process option.

The laser beam welding procedure per se is performed with the previously described laser beam welding process 1 using inert gas 5 and a filler wire 6 in order to integrally bond the two blank parts 2a, 2b together. For the welding procedure, the coating 2d present on the two blank parts 2a, 2b is not removed beforehand. The coating 2d extending as far as the edges, to be welded, of the blank parts 2a, 2b is also melted in the region of the weld seam and is a component of the melting bath 4.

The filler wire 6 has e.g. the following chemical compositions in wt. % shown in table 1. The remainder of Fe and unavoidable impurities are not separately listed in table 1. The filler wire 6 can be formed as a solid wire or alternatively as a flux-cored wire.

TABLE 1

| Example | Chemical composition with elements in wt. % | | | | | | | |
|---|---|---|---|---|---|---|---|---|
| filler wire | C | Si | Mn | Cr | Mo | V | B | Ti |
| A | 0.5 | 3.0 | 0.4 | 9.0 | | | | |
| B | 0.45 | 0.55 | 1.4 | 5.3 | 0.8 | | | |
| C | 0.5 | 2.5 | 1.0 | 2.5 | 0.2 | | | |
| D | 0.55 | 2.5 | 0.6 | 2 | | 0.2 | | |
| E | 0.6 | 3.0 | 0.8 | 2 | | | 0.0020 | 0.008 |
| F | 0.8 | 3.5 | 0.6 | | 1.0 | | | |
| G | 0.85 | 3.2 | 0.8 | | | 0.4 | | |
| H | 0.8 | 3.0 | 1.0 | | | | 0.0030 | 0.012 |

The composition of the filler wire 6 is selected such that the AlSi coating which has melted during the welding procedure and entered the melting bath 4 is effectively reduced. The filler wire 6 also causes thinning of the AlSi coating which has entered the melting bath 4 and also homogenization of the melting bath 4. In addition, the coating 2d, which has entered the melting bath 4, of possibly weakened microstructure regions is compensated for by the formation of strength-increasing and hardness-increasing carbides. Moreover, homogenization of the melting bath 4 is effected by the finely distributed carbides.

FIG. 1 also shows that the blank parts 2a, 2b which rest on the support 1 and are to be joined each consist of a base material 2c and coatings 2d on the upper and lower sides. The base material 2c of the two blank parts 2a, 2b is 22MnB5, a press-hardenable manganese-boron steel and the coating 2d consists of an AlSi alloy which is applied by hot-dipping. The press-hardenable manganese-boron steel can also be e.g. 30MnB5 or stronger or can also be joined combined with a non-press-hardenable steel, e.g. with an HC340LA. The preferably linear joining edges of the blank parts 2a, 2b lie against one another in the manner of a butt joint with a so-called zero gap. In this context, a zero gap is to be understood to mean a gap of less than 0.8 mm, in particular less than 0.4 mm. The AlSi alloy can have an Al content in the range of 70 to 90 wt. % Al. The blank parts 2a, 2b or the base materials 2c thereof have a thickness of 0.5 to 4.0 mm, preferably 0.8 to 3.0 mm and the coating 2d has a thickness of at most 200 µm. In this exemplified embodiment, the thickness of the blank parts 2a, 2b is different. The first blank part 2a has e.g. a thickness of 1.0 mm and the second blank part 2b has a thickness of 1.5 mm. Therefore, in the region of the butt joint of the two blank parts 2a, 3b there is a 0.5 mm jump in thickness on one side. This jump in thickness can of course also be on both sides, and be of a different size.

Preferably, the tailored blanks 2 are supplied to the automotive industry as semi-finished products and are further processed by said industry. Further processing includes forming, in particular press-hardening, in order to produce bodywork or chassis components from the tailored blanks 2, which components then have in each case the desired properties at different locations on the car. Press-hardening is understood in the typical sense to mean the hot-forming of a hardenable steel and subsequent rapid cooling. At least one blank part 2a, 2b—e.g. consisting of 22MnB5—of the tailored blank 2 has, prior to press-hardening, a yield strength Re of at least 300 MPa, a tensile strength Rm of at least 480 MPa and an elongation at fracture A80 of at least 10%. The press-hardenable manganese-boron steel can also be 30MnB5. After press-hardening with hot-forming at approximately 900 to 950° C. and subsequent rapid cooling (standard cooling rate 27 K/s or greater), at least one blank part 2a, 2b of the tailored blank 2 has a yield strength Re of at least 1100 MPa, a tensile strength Rm in the range of 1500 to 2000 MPa and an elongation at fracture A80 of approximately 5.0%.

Such bodywork or chassis components are, on a car, e.g. a main floor, a longitudinal chassis beam, a cross-member, a side panel, A-, B-, C-pillars, a cowl, a rear-end centerpiece, a reinforcement of the mudguard and inner doors. Of course, other bodywork or chassis components or fields of use such as e.g. engineering or construction are also feasible.

Figure 2:
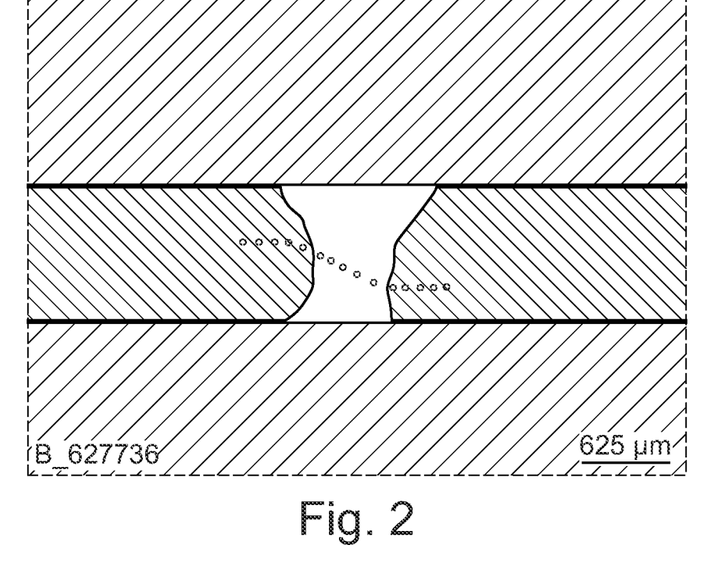
FIG. 2 shows a schematic micrograph of the region of a weld seam of a tailored and coated blank 2 in accordance with an aspect of the invention.

FIG. 2 shows a schematic micrograph of the region of a weld seam of a tailored blank 2 in accordance with the invention. For this purpose, two blank parts consisting of 22MnB5, each with a thickness of 1.50 mm and an AlSi coating, were connected by means of laser beam welding. Laser beam welding was performed with a laser power: P=5.0 kW, a feed: v=5.9 m/min, a filler wire feed: vD=3.0 m/min, a wire Ø: 1.0 mm, a wire quality such as the solid wire previously described by way of example, 30° directed beam, focusing position: −7.0 mm, inert gas: 12 l/min Corgon 10. Then, this tailored blank 2 was hardened with a standard press-hardening procedure without corresponding forming. For this purpose, heating to 950° C. was effected and this temperature was maintained for 6 min and then cooling to room temperature was effected at a cooling rate of 27 K/s. In this polished section, measuring points for a hardness profile test for evaluating the quality of the weld seam are marked.

Figure 3:
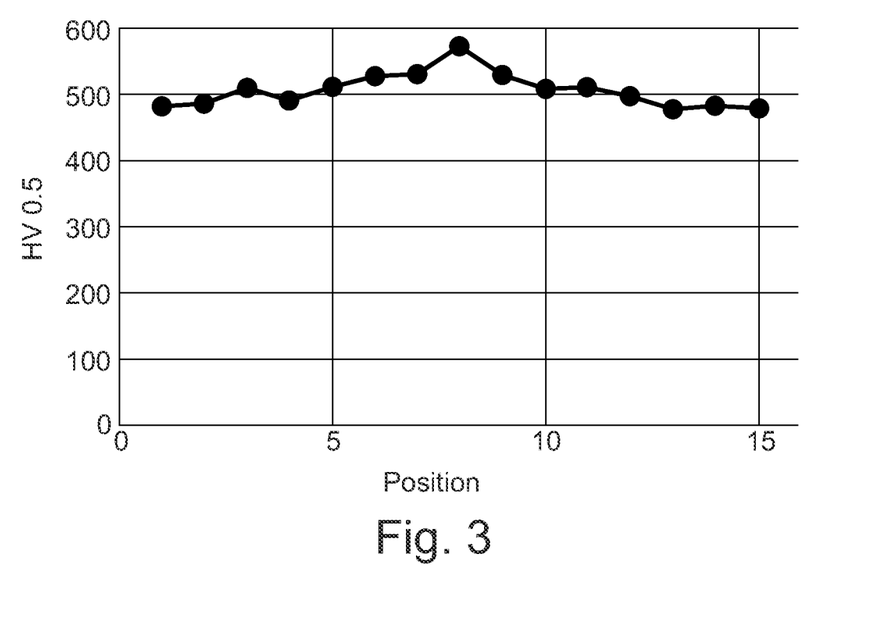
FIG. 3 shows the results of a hardness profile test over a section of FIG. 2.

FIG. 3 shows the results of the hardness profile test over the weld seam region. It is clear that, in particular in the region of the weld seam, there is no weakening of the tailored blank 2 produced in accordance with the invention. The determined measurement values are in the range 480 to 580 HV 0.5. The polished cross-section shows a desired, very homogeneous hardness profile.

Figure 4:
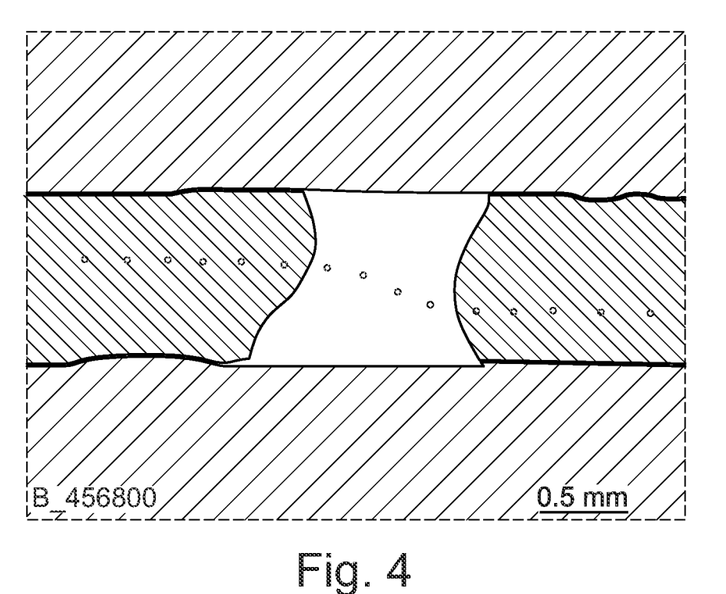
FIG. 4 shows a further schematic micrograph of the region of a weld seam produced using a conventional filler wire.
Figure 5:
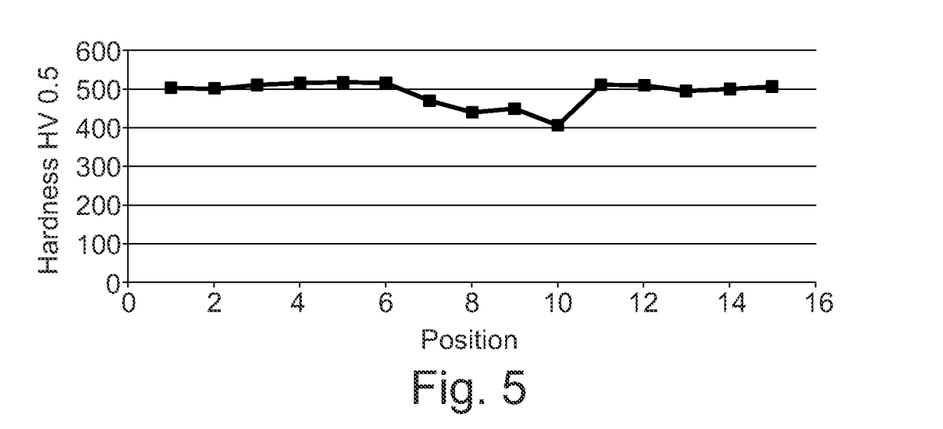
FIG. 5 shows the results of a hardness profile test over a section of FIG. 4.

FIG. 4 shows a further schematic micrograph of the region of a weld seam produced using a conventional filler wire, i.e. one not in accordance with the invention. The results associated therewith in FIG. 5 relating to a hardness profile test over the section of FIG. 4 shows, as expected, that there is a reduction in hardness quality in the region of the weld seam.

Laser beam welding for joining blank parts and tests conducted in this respect have been described in conjunction with the above exemplified embodiment. Fundamentally, it is feasible and practicable that laser-metal inert gas hybrid welding be used instead of laser beam welding. As is known, laser-metal inert gas hybrid welding is characterized by short welding times and low total weld seam costs. Laser-metal inert gas hybrid welding is a combination of a laser beam welding method and an electric arc welding method. A focused laser beam and the electric arc interact in a common melting bath. Laser-metal inert gas hybrid welding combines the advantages of the two methods, which can reside in a very stable welding process with high fusion power, a high degree of thermal efficiency, a narrow, deep penetration, a low heat input associated with minimum component warpage and a high welding speed.

The invention claimed is:

1. A method for producing a tailored blank from at least two blank parts, wherein at least one blank part comprises a press-hardenable manganese-boron steel, and wherein at least one blank part is provided on at least one side with a coating comprising aluminum or an aluminum-based alloy and the said method comprising:
  welding the at least two blank parts by laser beam welding or laser-metal inert gas hybrid welding using inert gas and supplying a filler wire, wherein the filler wire comprises the following chemical composition in wt. %:
  C: 0.41 to 0.9;
  Si: 0.4 to 4;
  Mn: 0.4 to 3; and
  Cr: 0 to 10;
  and with optional addition by alloying of one or more of the following additional elements:
  Mo: 0.01 to 1.0;
  B: 0.0008 to 0.0040;
  Ti: 2.5×B<=Ti<=5×B;
  V: 0.01 to 0.4;
  Nb: 0.01 to 0.2; and
  W: 0.01 to 0.2;
  with the remainder being Fe and unavoidable impurities.

2. The method as claimed in claim 1, wherein the filler wire has the following chemical composition in wt. %:
  C: 0.41 to 0.9;
  Si: 0.4 to 4;
  Mn: 0.4 to 3; and
  Cr: 2.0 to 10;
  with the remainder being Fe and unavoidable impurities.

3. The method as claimed in claim 1, wherein the filler wire has the following chemical composition in wt. %:
  C: 0.41 to 0.9;
  Si: 0.4 to 4;
  Mn: 0.4 to 3;
  Cr: 0.05 to 10;
  at least one of the following additional elements:
  Mo: 0.01 to 1.0, preferably 0.01 to 0.2;
  B: 0.0008 to 0.0040;
  Ti: 2.5×B<=Ti<=5×B;
  V: 0.01 to 0.4;
  Nb: 0.01 to 0.2; and
  W: 0.01 to 0.2;
  with the remainder being Fe and unavoidable impurities.

4. The method as claimed in claim 3, wherein the filler wire only has one or a group of the following additional elements in wt. %:
  Mo: 0.01 to 1.0; or
  V: 0.01 to 0.4; or
  B: 0.0008 to 0.0040 with Ti: 2.5×B<=Ti<=5×B.

5. The method as claimed in claim 1, wherein the filler wire has the following chemical composition in wt. %:
  C: 0.41 to 0.9;
  Si: 0.4 to 4;
  Mn: 0.4 to 3;
  at least one of the following additional elements:
  Mo: 0.01 to 1.0;
  B: 0.0008 to 0.0040;
  Ti: 2.5×B<=Ti<=5×B;
  V: 0.01 to 0.4;
  Nb: 0.01 to 0.2; and
  W: 0.01 to 0.2;
  with the remainder being Fe and unavoidable impurities.

6. The method as claimed in claim 5, wherein the filler wire only has one or a group of the following additional elements in wt. %:
  Mo: 0.01 to 1.0; or
  V: 0.01 to 0.4; or
  B: 0.0008 to 0.0040 with Ti: 2.5×B<=Ti<=5×B.

7. The method as claimed in claim 6, wherein a melting bath is formed during said welding the at least two blank parts, and wherein the filler wire is supplied to the melting bath at a temperature of 5 to 40° C.

8. The method as claimed in claim 1, wherein a melting bath is formed during said welding the at least two blank parts, and wherein the melting bath is produced exclusively by means of a laser beam or additionally with the electric arc of a laser-metal inert gas hybrid process.

9. The method as claimed in claim 1, wherein in addition to aluminum the aluminum-based alloy of the coating contains one or more of the elements Fe, Si, Mg or Cr, or is an AlSi alloy.

10. The method as claimed in claim 1, wherein the blank parts to be joined differ from each other or are similar in relation to material quality, thickness and/or coatings.

11. The method as claimed in claim 1, wherein the press-hardenable manganese-boron steel is 22MnB5 or 30MnB5.

12. The method as claimed in claim 1, wherein one of the blank parts to be joined consists of a non-press-hardenable steel.

13. The method as claimed in claim 1, wherein said method further comprises press-hardening the tailored blank.

14. A filler wire for the laser beam welding or laser-metal inert gas hybrid welding using inert gas for the integrally bonded connection of a tailored blank comprising at least two blank parts, of which at least one blank part comprises a press-hardenable manganese-boron steel and of which at least one blank part is provided on at least one side with a coating consisting of aluminum or an aluminum-based alloy, wherein the filler wire comprises the following chemical composition in wt. %:
  C: 0.41 to 0.9;
  Si: 0.4 to 4;
  Mn: 0.4 to 3;
  Cr: 0 to 10;
  and with optional addition by alloying of one or more of the following additional elements:
  Mo: 0.01 to 1.0;
  B: 0.0008 to 0.0040;
  Ti: 2.5×B<=Ti<=5×B;
  V: 0.01 to 0.4;
  Nb: 0.01 to 0.2; and
  W: 0.01 to 0.2;
  with the remainder being Fe and unavoidable impurities.

15. The filler wire as claimed in claim 14, wherein the filler wire has the following chemical composition in wt. %:
  C: 0.41 to 0.9;
  Si: 0.4 to 4;
  Mn: 0.4 to 3; and
  Cr: 2.0 to 10;
  with the remainder being Fe and unavoidable impurities.

16. The filler wire as claimed in claim 15, wherein the filler wire has the following chemical composition in wt. %:
  C: 0.41 to 0.9;
  Si: 0.4 to 4;
  Mn: 0.4 to 3;
  Cr: 0.05 to 10;
  at least one of the following additional elements:
  Mo: 0.01 to 1.0;
  B: 0.0008 to 0.0040;
  Ti: 2.5×B<=Ti<=5×B;

V: 0.01 to 0.4;
Nb: 0.01 to 0.2; and
W: 0.01 to 0.2;
with the remainder being Fe and unavoidable impurities.

17. The filler wire as claimed in claim 16, wherein the filler wire only has one or a group of the following additional elements in wt. %:
Mo: 0.01 to 1.0; or
V: 0.01 to 0.4; or
B: 0.0008 to 0.0040 with Ti: $2.5 \times B \leq Ti \leq 5 \times B$.

18. The filler wire as claimed in claim 14, wherein the filler wire has the following chemical composition in wt. %:
C: 0.41 to 0.9;
Si: 0.4 to 4;
Mn: 0.4 to 3;
at least one of the following additional elements:
Mo: 0.01 to 1.0;
B: 0.0008 to 0.0040;
Ti: $2.5 \times B \leq Ti \leq 5 \times B$;
V: 0.01 to 0.4;
Nb: 0.01 to 0.2; and
W: 0.01 to 0.2;
with the remainder being Fe and unavoidable impurities.

19. The filler wire as claimed in claim 18, wherein the filler wire only has one or a group of the following additional elements in wt. %:
Mo: 0.01 to 1.0; or
V: 0.01 to 0.4; or
B: 0.0008 to 0.0040 with Ti: $2.5 \times B \leq Ti \leq 5 \times B$.

20. Use of a filler wire as claimed in claim 14 for a method for producing a tailored blank from at least two blank parts, of which at least one blank part consists of a press-hardenable manganese-boron steel, and of which at least one blank part is provided on at least one side with a coating consisting of aluminum or an aluminum-based alloy, wherein said method comprises connecting the at least two blank parts by laser beam welding or laser-metal inert gas hybrid welding using inert gas and supplying the filler wire.

* * * * *

UNITED STATES PATENT AND TRADEMARK OFFICE
CERTIFICATE OF CORRECTION

| | | |
|---|---|---|
| PATENT NO. | : 12,447,556 B2 | Page 1 of 1 |
| APPLICATION NO. | : 17/626378 | |
| DATED | : October 21, 2025 | |
| INVENTOR(S) | : Hans-Christian Schmale et al. | |

It is certified that error appears in the above-identified patent and that said Letters Patent is hereby corrected as shown below:

In the Claims
Column 9
Line 2, Claim 1, add --,-- after "alloy"
Line 3, Claim 1, delete "and the" before "said"
Line 36, Claim 3, delete ", preferably 0.01 to 0.2"

Signed and Sealed this
Second Day of December, 2025

John A. Squires
*Director of the United States Patent and Trademark Office*